United States Patent [19]
Amano et al.

[11] Patent Number: 5,416,184
[45] Date of Patent: May 16, 1995

[54] HIGH-MOLECULAR WEIGHT POLYCARBODIIMIDE SOLUTION AND METHODS FOR PRODUCING THE SAME

[75] Inventors: Satoshi Amano; Yasuo Imashiro, both of Tokyo, Japan

[73] Assignee: Nisshinbo Industries, Inc., Tokyo, Japan

[21] Appl. No.: 517,124

[22] Filed: May 1, 1990

[30] Foreign Application Priority Data
  May 2, 1989 [JP] Japan ................................. 1-113050

[51] Int. Cl.$^6$ ............................................. C08G 18/00
[52] U.S. Cl. .................................... 528/44; 528/48; 528/51; 524/706; 524/709; 524/710; 524/751; 524/754; 524/792
[58] Field of Search .............................. 528/44, 48, 51; 524/706, 709, 710, 751, 754, 792

[56] References Cited
U.S. PATENT DOCUMENTS
2,941,966  6/1960  Campbell .............................. 528/51
4,042,558  8/1977  Bonin et al. .......................... 525/907
4,088,665  5/1978  Findeisen et al. ..................... 528/51
4,939,210  7/1990  Imashiro et al. ..................... 525/452

OTHER PUBLICATIONS
Brandrup & Immergut; Polymer Handbook, 1966, pp. IV 344, 345, 348, 352.
J. M. G. Cowie; *Polymers: Chemistry & Physics of Modern Materials*; 1973; p. 144.

Primary Examiner—John Kight, III
Assistant Examiner—R. F. Johnson
Attorney, Agent, or Firm—Adduci, Mastriani, Schaumberg & Schill

[57] ABSTRACT

This invention provides methods for producing a high-molecular weight polycarbodiimide solution from an organic diisocyanate in the presence of a carbodiimidation catalyst, wherein 1) a chlorinated aliphatic hydrocarbon or 2) an alicyclic ether is used as a solvent. This invention also provides a polycarbodiimide solution with excellent stability in preservation.

14 Claims, 4 Drawing Sheets

HIGH-MOLECULAR WEIGHT POLYCARBODIIMIDE SOLUTION AND METHODS FOR PRODUCING THE SAME

BACKGROUND OF THE INVENTION

1. Field of the Invention

The present invention relates to a polycarbodiimide solution and methods for producing the same, and particularly, to a high-molecular weight polycarbodiimide solution with excellent stability in preservation which can be obtained by appropriately choosing reaction conditions such as a solvent used in the production of the solution, and to a method for producing said polycarbodiimide solution.

2. Prior Art

It is known that polycarbodiimides, particularly aromatic polycarbodiimides, have a high level of heat resistance, and such polycarbodiimides are therefore used as thermosetting resin materials for molding which are hot-pressed in a powder form.

A method for producing said polycarbodiimides is disclosed in Japanese Patent Laid-Open No. 51-61599, and other methods are reported in D. J. Lyman et al., Die Makromol. Chem., 67, 1 (1963) and E. Dyer et al., J. Amer. Chem. Soc., 80, 5495 (1958) . Each of these methods uses, as a polymerization solvent, a hydrocarbon such as benzene, xylene, decalin, toluene or the like, or, o-dichlorobenzene, chlorobenzene, cyclohexanone, a mixture of dimethyl sulfoxide and chlorobenzene (1:1), N-methylpyrrolidone or the like, and uses as a monomer, one of various organic diisocyanates such as 4,4'-diphenylmethane diisocyanate, tolylene diisocyanate and the like or mixtures thereof, in a concentration within the range of 10 to 25% by weight.

The polycarbodiimides obtained by the production methods mentioned in the above documents are powdery, and the films also mentioned in the above documents are produced by extracting the polycarbodiimides from the reaction system after 10 minutes from the start of reaction and then casting it.

And moreover, since gelation or precipitation occurs in the reaction system over 10 minutes after the start of the above reaction, the polycarbodiimides thus obtained cannot be used in the form of a stable solution. Namely, high-molecular weight polycarbodiimide solutions having excellent stability cannot be obtained by the above methods.

Another method for producing polycarbodiimides is a method in which the terminal isocyanate groups are sealed. L. M. Alberino et al., J. Appl. Polym. Sci., 21, 1999 (1977) and T. W. Campbell, J. Org. Chem., 28, 2069 (1963) also show methods for producing polycarbodiimides from organic diisocyanates in which the molecular weight of the polycarbodiimides produced is controlled by adding the organic monoisocyanate to the reaction system. In any one of these production methods, reaction is effected by using as a solvent a hydrocarbon such as benzene, xylene, petroleum ether or the like to produce a polycarbodiimide as a precipitate product. Namely, polycarbodiimide solutions cannot be obtained by the above mentioned production methods, and it is obvious that polycarbodiimides having a high molecular weight cannot be obtained.

SUMMARY OF THE INVENTION

The present invention has been achieved as a result of energetic research on reaction conditions which includes choosing a specific solvent, which has not been used in the prior art, for a particular organic diisocyanate. Accordingly, it is an object of the present invention to solve the problem of the above-described prior art and provide a method for easily and simply producing a high-molecular weight polycarbodiimide solution having excellent stability.

To this end, the present invention provides a method for producing a high-molecular weight polycarbodiimide solution from an organic diisocyanate in the presence of a carbodiimidation catalyst by using a chlorinated aliphatic hydrocarbon as a solvent.

The present invention also provides a high-molecular weight polycarbodiimide solution obtained from an organic diisocyanate by using a chlorinated aliphatic hydrocarbon as a solvent in the presence of a carbodiimidation catalyst.

The present invention also provides a method for producing a high-molecular weight polycarbodiimide solution from an organic diisocyanate in the presence of a carbodiimidation catalyst by using an alicyclic ether as a solvent.

The present invention also provides a high-molecular weight polycarbodiimide solution obtained from an organic diisocyanate by using an alicyclic ether as a solvent in the presence of a carbodiimidation catalyst.

DESCRIPTION OF PREFERRED EMBODIMENTS

Figure 1:
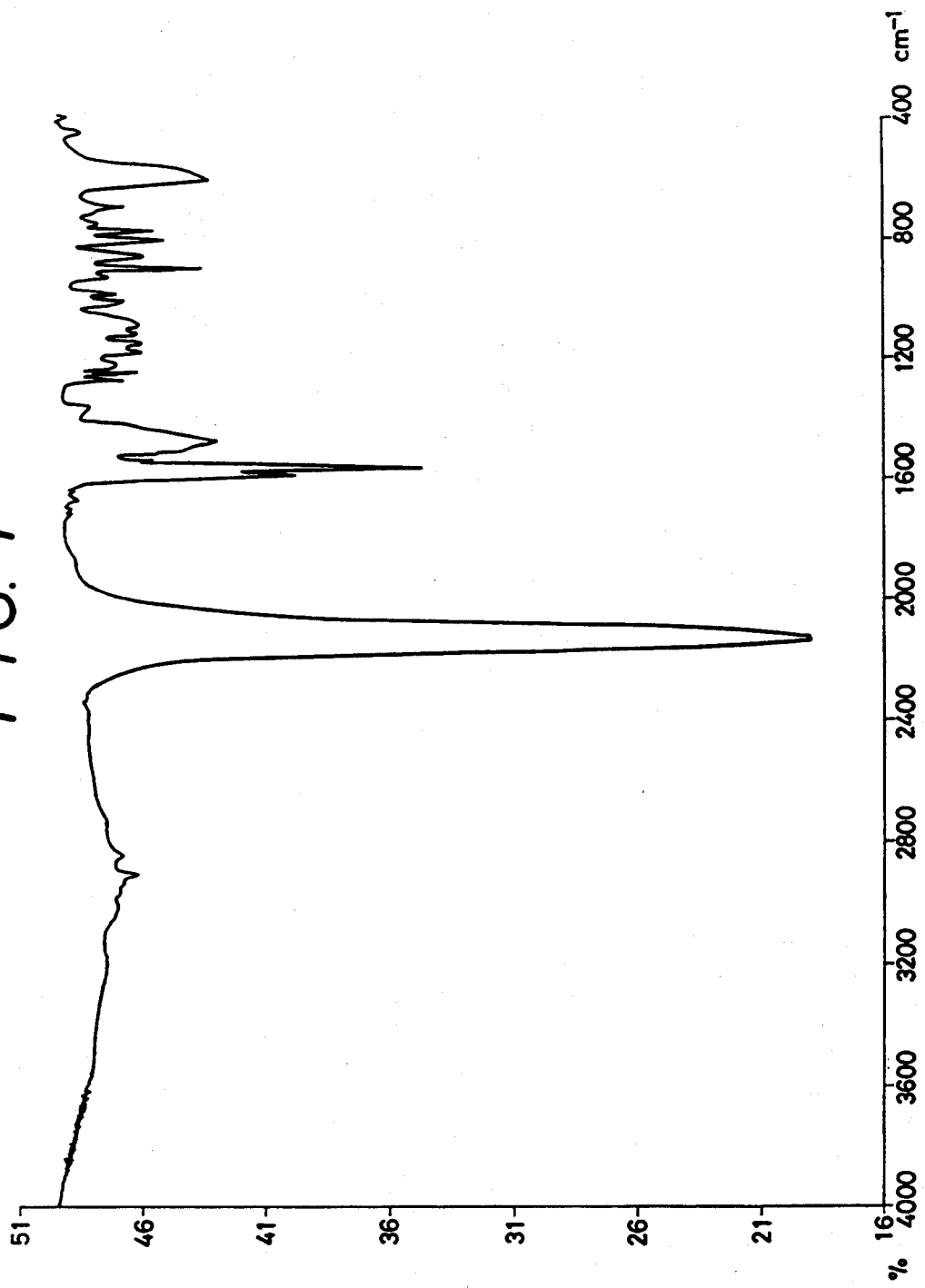
FIG. 1 is a drawing which shows the IR spectrum of the polycarbodiimide solution of the present invention obtained in Example 1.

The present invention is described in detail below.

An example of organic diisocyanates, that may be used as raw material compounds in the present invention, is expressed by the following formula:

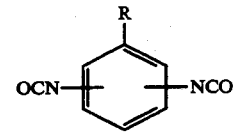

wherein R denotes a lower alkyl or alkoxy group. Examples of such diisocyanates include 2,4-tolylene diisocyanate, 2,6-tolylene diisocyanate, a mixture of 2,4-tolylene diisocyanate and 2,6-tolylene diisocyanate, 1-methoxyphenyl-2,4-diisocyanate and the like.

In the present invention, the reaction of each of these organic diisocyanates is effected in chlorinated aliphatic hydrocarbon which preferably has a boiling point of 80° C. or more. Examples of such hydrocarbons include pentachloropropane, 1,2-dichloroethane, 1,1,1-trichloroethane, 1,1,2,2-tetrachloroethane, tetrachloroethylene, trichloroethylene and solvent mixtures thereof.

When one of the above organic diisocyanates is used, the concentration thereof is preferably 15% by weight or less, more preferably 10% by weight or less.

If a solvent other than the above-described solvents, i.e., a known polymerization solvent, is used in the present invention, a polycarbodiimide is obtained in the form of precipitates and cannot be obtained in the form of a solution. When any one of the above solvents is used, if the concentration of the organic diisocyanate exceeds 15% by weight, although a polycarbodiimide solution can be obtained, in most cases, it exhibits poor stability and forms gel within 3 days when being allowed to stand at room temperature. Further, it is known that, since the amount of the isocyanate remaining in the polycarbodiimide solution increases as the concentration of the diisocyanate increases, a high molecular weight cannot be attained at a high concentration of diisocyanate.

As a result of infrared absorption spectroscopy (the product obtained by a conventional method shows remarkable absorption by remaining isocyanates) or titration of isocyanate by the dibutylamine method, it was confirmed that no isocyanate remains, and no by-product is produced in the polycarbodiimide solution obtained by the production method of the present invention. And the stability of the solution was also confirmed by allowing it to stand in a refrigerator or at room temperature.

As apparent from the results, the polycarbodiimide solution of the present invention obtained from an organic diisocyanate by using as a solvent a chlorinated aliphatic hydrocarbon in the presence of a carbodiimidation catalyst, contains no remaining isocyanate and by-product and has excellent stability.

Another example of organic diisocyanates, that may be used as raw material compounds in the present invention, is expressed by the following formula:

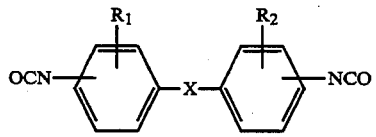

wherein $R_1$ and $R_2$ each denote a hydrogen atom or a lower alkyl or alkoxy group; and X denotes an oxygen atom or a methylene group. Examples of such compounds include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate and mixtures thereof.

In the present invention, reaction of each of these organic diisocyanates is effected in an alicyclic ether which is preferably a liquid at room temperature and has two ether bonds or less in its molecule. Examples of such ethers include tetrahydrofuran, dioxane, tetrahydropyran and solvent mixtures thereof. Of these ethers, tetrahydrofuran is preferable.

When one of the above organic diisocyanates is used, the concentration thereof is preferably 10% by weight or less, more preferably 7% by weight or less.

If a solvent other than the above-described solvents, i.e., a known polymerization solvent, is used in the present invention, gelation takes place during reaction or a polycarbodiimide is obtained in the form of precipitates and cannot be obtained in the form of a solution. It is also confirmed that the solution contains a large amount of remaining isocyanate before the gelation or the precipitation. This shows that a high molecular weight is not attained. On the other hand, when any one of the above solvents is used, if the concentration of the organic diisocyanate exceeds 10% by weight, although a polycarbodiimide solution can be obtained, in most cases, it exhibits poor stability and forms gel within 3 days when being allowed to stand at room temperature. Further, it is known that, since the amount of the isocyanate remaining in the polycarbodiimide solution increases as the concentration of the diisocyanate increases, a high molecular weight cannot be attained at a high concentration of diisocyanate.

As a result of infrared absorption spectroscopy (the product obtained by a conventional method shows remarkable absorption by remaining isocyanates) or titration of isocyanate by the dibutylamine method, it was confirmed that no isocyanate remains, and no by-product is produced in the polycarbodiimide solution obtained by the production method of the present invention. And the stability of the solution was also confirmed by allowing it to stand in a refrigerator or at room temperature.

As apparent from the results, the polycarbodiimide solution of the present invention obtained from an organic diisocyanate by using as a solvent an alicyclic ether in the presence of a carbodiimidation catalyst, contains no remaining isocyanate and by-product and has excellent stability.

In any case of reaction, a phosphorene oxide such as 1-phenyl-2-phosphorene-1-oxide, 3-methyl-2-phosphorene-1-oxide, 1-ethyl-3-methyl-2-phosphorene-1-oxide, 1-ethyl-2-phosphorene-1-oxide or a 3-phosphorene isomer thereof is used as the carbodiimidation catalyst.

In the present invention, the type and the concentration of the organic diisocyanate used as a raw material or the solvent used is taken into consideration so that a stable high-molecular weight polycarbodiimide solution can be easily and simply obtained.

The polycarbodiimide solution obtained in the present invention exhibits excellent stability in preservation and can be thus used as varnish in the industrial field. In addition, the film obtained from said solution is characterized by its excellent mechanical properties, as compared with the films obtained by conventional press molding.

Examples and Comparative Examples of the present invention are described below.

EXAMPLE 1

54 g of a mixture consisting of 2,4-tolylene diisocyanate and 2,6-tolylene diisocyanate (a mixing ratio, 80:20, referred to as TDI hereinafter) was reacted in the presence of 0.13 g of a carbodiimidation catalyst (1-phenyl-3-methylphosphorene oxide) in 500 ml of tetrachloroethylene at 120° C. for 4 hours to obtain a polycarbodiimide solution.

FIG. 1 shows the infrared absorption spectrum of the thus-obtained polycarbodiimide solution. There is no absorption at 2260 cm$^{-1}$ corresponding to remaining isocyanates. This reveals that the reaction proceeded to an extent, in which no isocyanate remained, to produce a high-molecular weight polycarbodiimide solution. The solution obtained was stable for 3 weeks at room temperature and 3 months in a refrigerator (5° C.) and thus had excellent stability.

EXAMPLE 2

35 g of TDI, which was the same as that used in Example 1, was reacted in the presence of 0.09 g of a carbodiimidation catalyst in 500 ml of tetrachloroethylene at 120° C. for 5.5 hours to obtain a polycarbodiimide solution. The thus-obtained solution was stable for 3 weeks at room temperature and for 3 months in a refrigerator.

EXAMPLE 3

40 g of TDI, which was the same as that used in Example 1, was reacted in the presence of 0.1 g of a carbodiimidation catalyst in 500 ml of trichloroethylene at 87° C. for 7 hours to obtain a polycarbodiimide solution. The thus-obtained solution was stable for 3 weeks at room temperature.

EXAMPLE 4

50 g of TDI, which was the same as that used in Example 1, was reacted in the presence of 0.13 g of a carbodiimidation catalyst in 600 ml of a solvent mixture consisting of perchloroethylene and trichloroethylene (2:1) at the reflux temperature of the solvent mixture for 6 hours to obtain a polycarbodiimide solution. The thus-obtained solution was stable for 3 weeks at room temperature.

EXAMPLE 5

40 g of TDI, which was the same as that used in Example 1, was reacted in the presence of 0.1 g of a carbodiimidation catalyst in 600 ml of a solvent mixture containing perchloroethylene and trichloroethylene (1:2) at the reflux temperature of the solvent mixture for 7 hours to obtain a polycarbodiimide solution. The thus-obtained solution was stable for 3 weeks at room temperature.

EXAMPLE 6

80 g of TDI, which was the same as that used in Example 1, was reacted in the presence of 0.2 g of a carbodiimidation catalyst in 500 ml of perchloroethylene at 120° C. for 4 hours to obtain a polycarbodiimide solution. The thus-obtained solution was stable for 3 weeks at room temperature.

COMPARATIVE EXAMPLE 1

150 g of TDI, which was the same as that used in Example 1, was reacted in the presence of 0.38 g of a carbodiimidation catalyst in 300 ml of perchloroethylene at 120° C. Gelation took place after 3 hours had passed, and a polycarbodiimide solution could not be obtained.

COMPARATIVE EXAMPLE 2

180 g of TDI, which was the same as that used in Example 1, was reacted in the presence of 0.2 g of a carbodiimidation catalyst in 500 ml of xylene at 120° C. Precipitates were produced after about 2.5 hours had passed, and a polycarbodiimide solution could not be obtained.

COMPARATIVE EXAMPLE 3

150 g of TDI, which was the same as that used in Example 1, was reacted in the presence of 0.3 g of a carbodiimidation catalyst in 300 ml of tetrachloroethylene at 120° C. The reaction was stopped before gelation took place.

Figure 2:
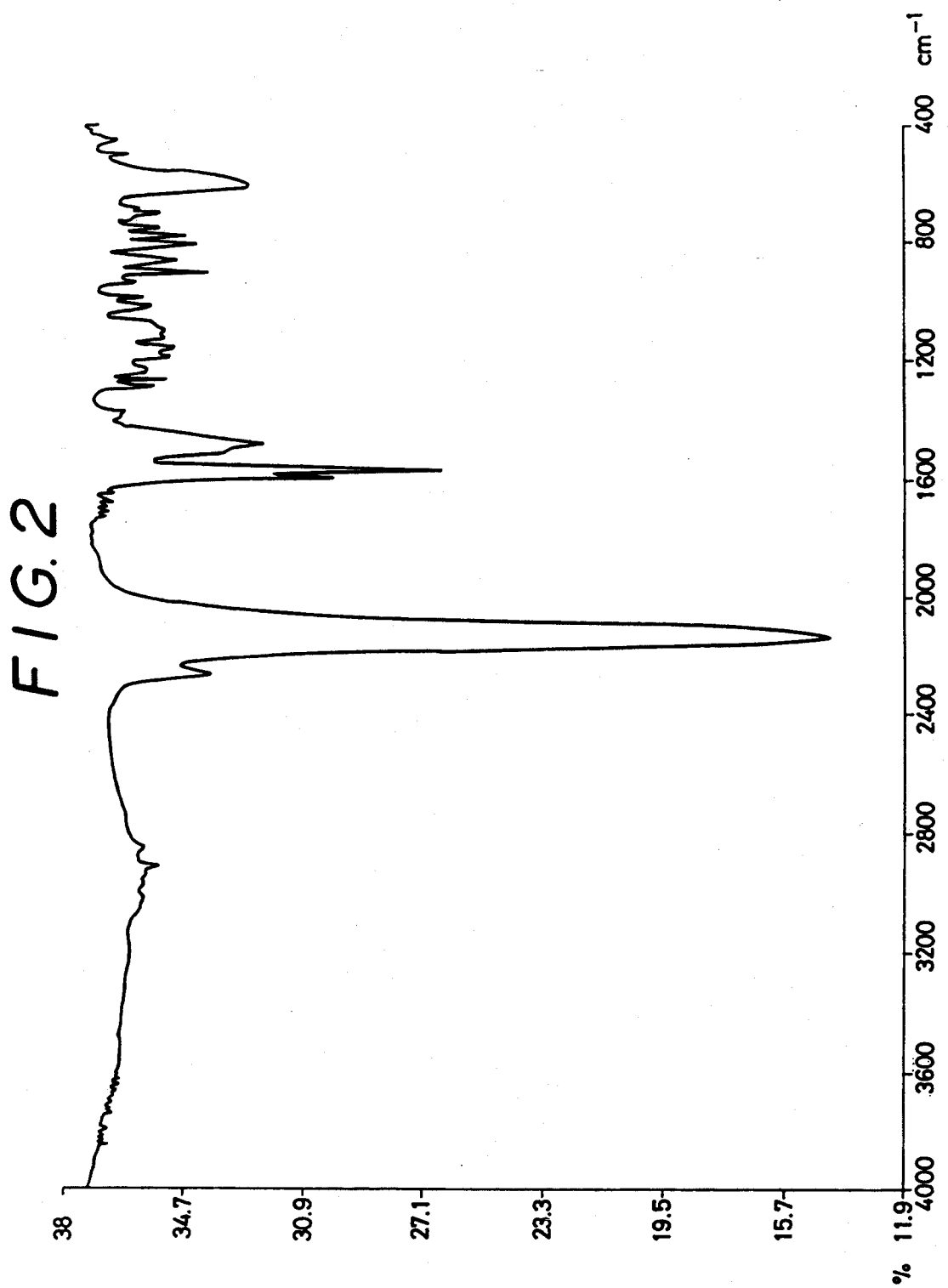
FIG. 2 is a drawing which shows the IR spectrum of the polycarbodiimide solution obtained in Comparative Example 3.

FIG. 2 shows the infrared absorption spectrum of the reaction product. Absorption corresponding to remaining isocyanate was observed at 2260 cm$^{-1}$. This reveals that the isocyanate remained and polymerization insufficiently proceeded.

The solution gelled after being allowed to stand at room temperature for 2 days.

EXAMPLE 7

50 g of 4,4'-diphenylmethane diisocyanate (referred to as MDI hereinafter) was reacted in the presence of 0.1 g of a carbodiimidation catalyst in 700 ml of tetrahydrofuran (THF) at 67° C. for 16 hours to produce a polycarbodiimide solution.

Figure 3:
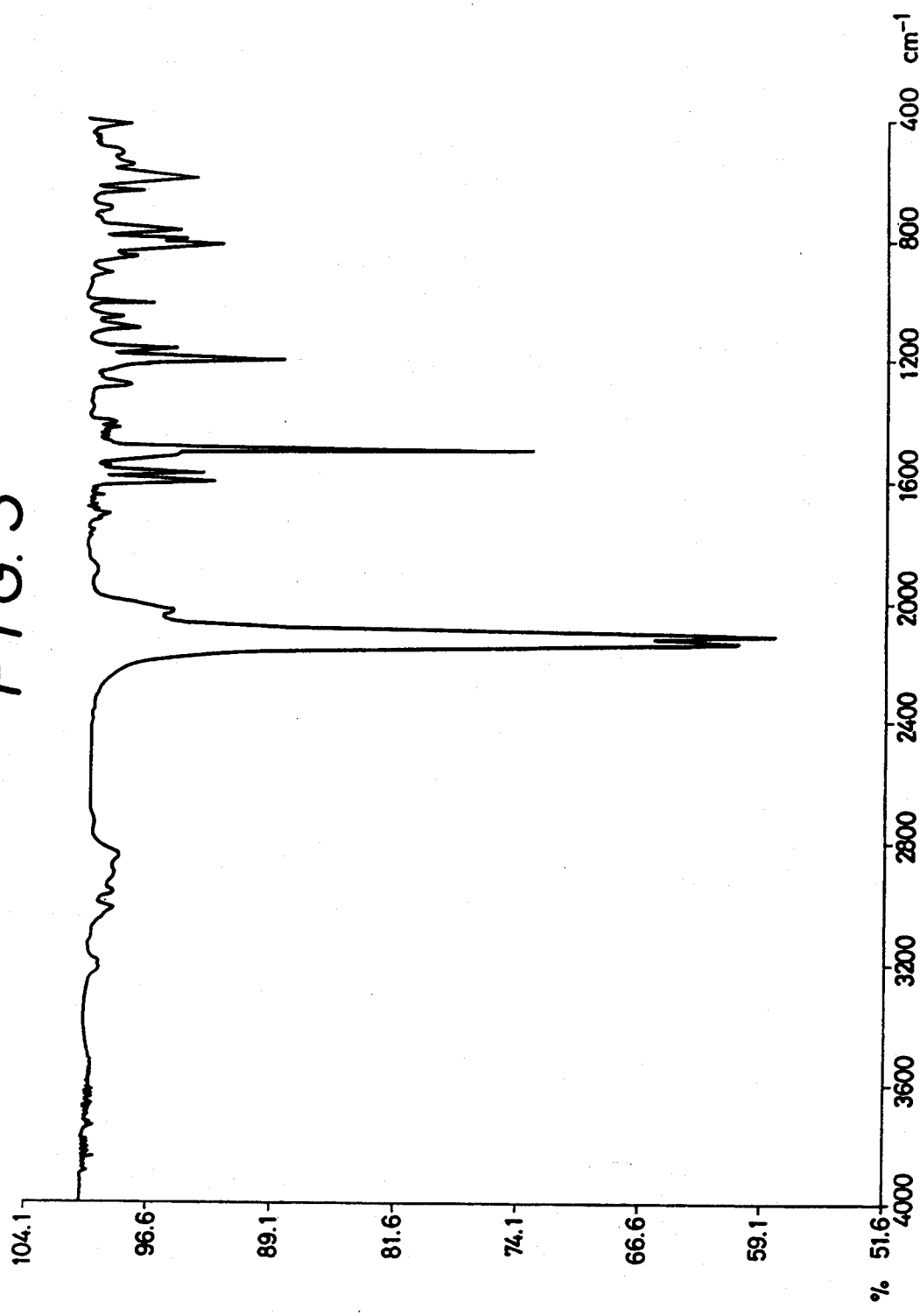
FIG. 3 is a drawing which shows the IR spectrum of the polycarbodiimide solution of the present invention obtained in Example 7.

FIG. 3 shows the infrared absorption spectrum of the thus-obtained polycarbodiimide solution. There is no absorption at 2260 cm$^{-1}$ corresponding to remaining isocyanate. This reveals that the reaction proceeded to an extent, in which no isocyanate remained, to produce a high-molecular weight polycarbodiimide solution. The solution obtained was stable for 1 month at room temperature.

EXAMPLE 8

50 g of MDI, which was the same as that used in Example 7, was reacted in the presence of 0.1 g of a carbodiimidation catalyst in 500 ml of tetrahydrofuran at 67° C. for 8 hours to obtain a polycarbodiimide solution. The thus-obtained solution was stable for 3 weeks at room temperature.

EXAMPLE 9

50 g of MDI, which was the same as that used in Example 7, was reacted in the presence of 0.1 g of a carbodiimidation catalyst in 600 ml of tetrahydropyran at 88° C. for 7 hours to obtain a polycarbodiimide solution. The thus-obtained solution was stable for 1 month in a refrigerator.

EXAMPLE 10

50 g of MDI, which was the same as that used in Example 7, was reacted in the presence of 0.1 g of a carbodiimidation catalyst in 500 ml of dioxane at 100° C. for 5 hours to obtain a polycarbodiimide solution. The thus-obtained solution was stable for 1 month in a refrigerator.

EXAMPLE 11

50 g of MDI, which was the same as that used in Example 7, was reacted in the presence of 0.1 g of a carbodiimidation catalyst in 500 ml of a solvent mixture consisting of tetrahydrofuran and dioxane (1:1) at the reflux temperature of the solvent mixture for 11 hours to obtain a polycarbodiimide solution. The thus-obtained solution was stable for 3 weeks at room temperature.

EXAMPLE 12

50 g of MDI, which was the same as that used in Example 7, was reacted in the presence of 0.1 g of a carbodiimidation catalyst in 600 ml of a solvent mixture consisting of tetrahydrofuran, dioxane and tetrahydropyran (2:1:1)) at the reflux temperature of the solvent mixture for 10 hours to obtain a polycarbodiimide solution. The thus-obtained solution was stable for 3 weeks at room temperature.

COMPARATIVE EXAMPLE 4

100 g of MDI, which was the same as that used in Example 7, was reacted in the presence of 0.1 g of a carbodiimidation catalyst in 300 ml of tetrahydrofuran. However, the reaction solution gelled after 5 hours had passed, and a polycarbodiimide solution could not be obtained.

COMPARATIVE EXAMPLE 5

50 g of MDI, which was the same as that used in Example 7, was reacted in the presence of 0.1 g of a carbodiimidation catalyst in 500 ml of xylene at 120° C. However, precipitates were produced after 3 hours had passed, and a polycarbodiimide solution could not be obtained.

COMPARATIVE EXAMPLE 6

50 g of MDI, which was the same as that used in Example 7, was reacted in the presence of 0.1 g of a carbodiimidation catalyst in 500 ml of tetrachloroethylene at 120° C. However, precipitates were produced after 3 to 4 hours had passed, and a polycarbodiimide solution could not be obtained.

COMPARATIVE EXAMPLE 7

Figure 4:
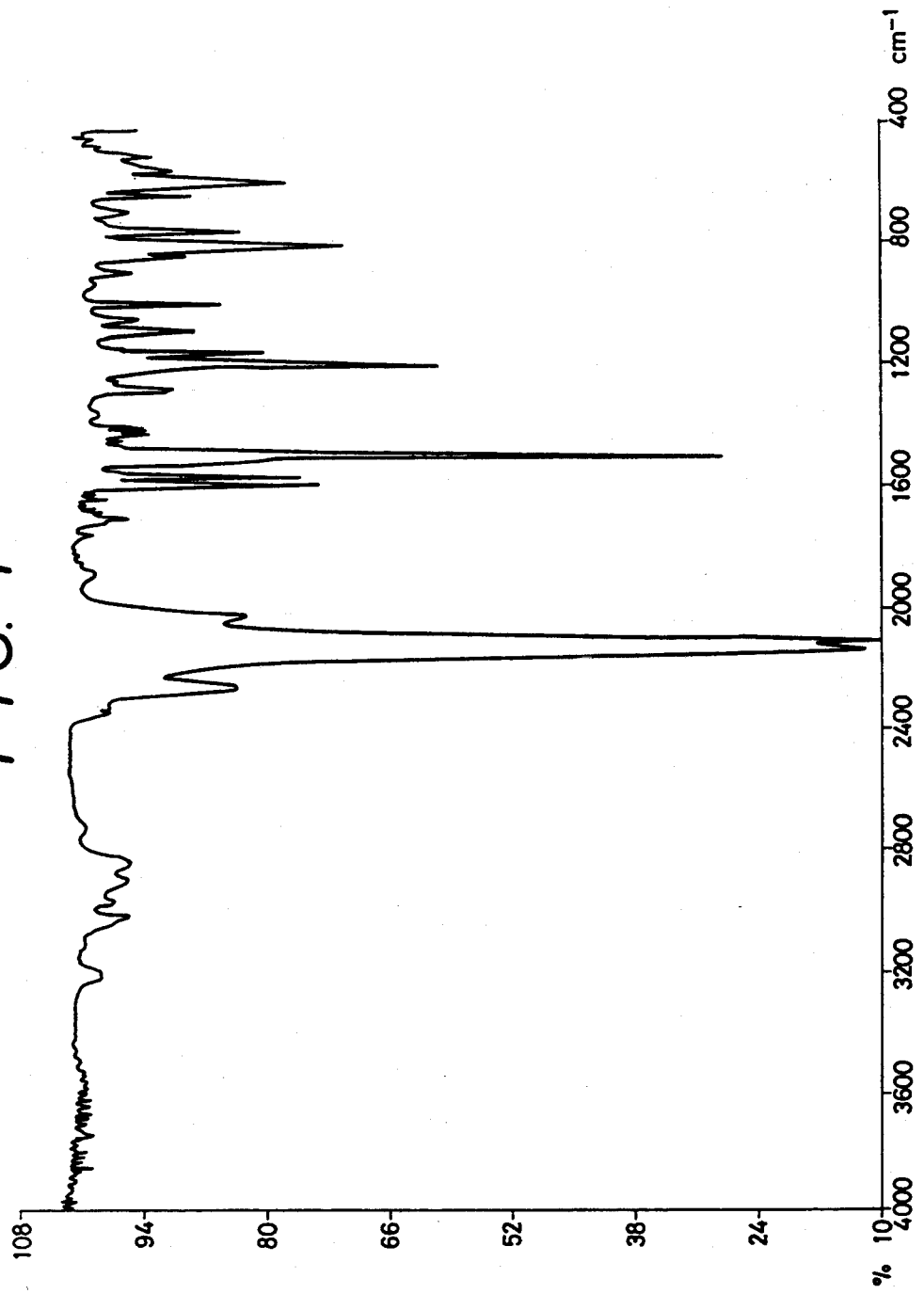
FIG. 4 is a drawing which shows the IR spectrum of the polycarbodiimide solution obtained in Comparative Example 7.

150 g of MDI, which was the same as that used in Example 7, was reacted in the presence of 0.38 g of a carbodiimidation catalyst in 500 ml of tetrahydrofuran at 67° C. The reaction was stopped before gelation took place. FIG. 4 shows the infrared spectrum of the reaction product. Absorption was observed at 2260 cm$^{-1}$ corresponding to remaining isocyanates. This reveals that polymerization insufficiently proceeded.

The solution obtained gelled after being allowed to stand for 1.5 days at room temperature.

What is claimed is:

1. A method for producing a polycarbodiimide solution from an organic diisocyanate expressed by the following formula:

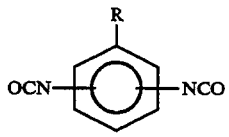

wherein R denotes a lower alkyl group or alkoxy group, in the presence of a carbodiimidation catalyst, wherein a chlorinated aliphatic hydrocarbon is used as a solvent, the concentration of organic diisocyanate is 15% by weight or less, and the reaction proceeds to an extent such that no remaining diisocyanate is detected by infrared absorption spectroscopy or titration.

2. A method for producing a polycarbodiimide solution according to claim 1, wherein the chlorinated aliphatic hydrocarbon is selected from the group consisting of pentachloropropane, 1,2-dichloroethane, 1,1,1-trichloroethane, 1,1,2,2-tetrachloroethane, tetrachloroethylene, trichloroethylene, and mixtures thereof.

3. A method for producing a polycarbodiimide solution from an organic diisocyanate expressed by the following formula:

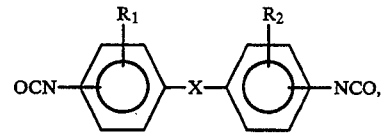

wherein $R_1$ and $R_2$ each denote a hydrogen atom, a lower alkyl or alkoxy group; and X denotes an oxygen atom or a methylene group, in the presence of a carbodiimidation catalyst, wherein the concentration of organic diisocyanate is 10% by weight or less, and an alicyclic ether is used as a solvent.

4. A method for producing a polycarbodiimide solution according to claim 3, wherein the alicyclic ether is selected from the group consisting of tetrahydrofuran, dioxane, tetrahydropyran, and mixtures thereof.

5. A method for producing a polycarbodiimide solution according to claim 1 or 2, wherein said organic diisocyanate is tolylene diisocyanate.

6. A method for producing a polycarbodiimide solution according to claim 2, wherein tetrachloroethylene, trichloroethylene or a solvent mixture thereof is used as said chlorinated aliphatic hydrocarbon.

7. A polycarbodiimide solution comprising the product obtained by the polymerization of an organic diisocyanate of the formula:

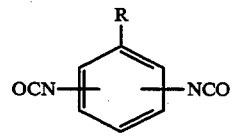

wherein R denotes a lower alkyl group or alkoxy group, using a chlorinated aliphatic hydrocarbon as a solvent in the presence of a carbodiimidation catalyst, said solution not containing residual diisocyanate.

8. A method for producing a polycarbodiimide solution according to claim 3 or 4, wherein the organic diisocyanate is 4,4'-diphenylmethane diisocyanate, 4,4'-diphenylether diisocyanate or a mixture thereof.

9. A polycarbodiimide solution comprising the product obtained by the polymerization of an organic diisocyanate of the formula:

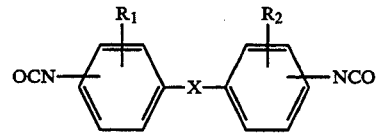

wherein $R_1$ and $R_2$ each denote a hydrogen atom, a lower alkyl or alkoxy group and X denotes an oxygen atom or a methylene group, using an alicyclic ether as a solvent in the presence of a carbodiimidation catalyst, said solution not containing residual diisocyanate.

10. A method for producing a polycarbodiimide solution according to claim 1, wherein the boiling point of the chlorinated aliphatic hydrocarbon used is 80° C. or more.

11. A method for producing a polycarbodiimide solution according to claim 1, wherein the reaction temperature is 80° C. or more.

12. A method for producing a polycarbodiimide solution according to claim 1, wherein the reaction time is four hours or more.

13. A method for producing a polycarbodiimide solution according to claim 3, wherein the reaction temperature is 65° C. or more.

14. A method for producing a polycarbodiimide solution according to claim 3, wherein the reaction time is five hours or more.

* * * * *